US011837910B2

(12) United States Patent
Matsumoto et al.

(10) Patent No.: US 11,837,910 B2
(45) Date of Patent: Dec. 5, 2023

(54) POWER SUPPLY CONTROL APPARATUS AND CONTROL METHOD (71) Applicant: DENSO TEN Limited, Kobe (JP)

(72) Inventors: Takeshi Matsumoto, Kobe (JP); Daiki Hakushima, Kobe (JP); Shunsuke Kobayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/698,413

(22) Filed: Mar. 18, 2022

(65) Prior Publication Data

US 2023/0198289 A1 Jun. 22, 2023

(30) Foreign Application Priority Data

Dec. 20, 2021 (JP) ................. 2021-205997

(51) Int. Cl.
*H02J 9/06* (2006.01)
*B60L 3/00* (2019.01)
*B60L 53/20* (2019.01)

(52) U.S. Cl.
CPC ............ *H02J 9/061* (2013.01); *B60L 3/0069* (2013.01); *B60L 53/20* (2019.02); *H02J 9/068* (2020.01); *B60L 2210/10* (2013.01)

(58) Field of Classification Search
CPC . H02J 9/061; H02J 9/068; B60L 53/20; B60L 3/0069; B60L 2210/10
See application file for complete search history.

(56) References Cited

U.S. PATENT DOCUMENTS

2017/0080883 A1* 3/2017 Yasunori ........... H02J 7/007182
2018/0009400 A1* 1/2018 Lee ...................... B60R 16/03
2022/0094195 A1* 3/2022 Lee ...................... H02J 9/061

FOREIGN PATENT DOCUMENTS

JP        2018-182864 A     11/2018

* cited by examiner

*Primary Examiner* — Jared Fureman
*Assistant Examiner* — Duc M Pham
(74) *Attorney, Agent, or Firm* — Oliff PLC (57) ABSTRACT A power supply control apparatus includes: a first system capable of supplying electric power from a first power supply to a first load; a second system capable of supplying electric power from a second power supply to a load group including a second load and a third load having consumed electric power smaller than that of the second load; a plurality of load switches as defined herein; and a control unit configured to control the load switches so that backup control performed by the second system is executed by the electric power supply from the second power supply, in a case where an occurrence of a ground fault in the first system is detected, and when the control unit inspects as to whether the backup control can be executed, the control unit connects the load switch corresponding to the third load of the load group to execute the inspection.

14 Claims, 8 Drawing Sheets

FIG. 8

POWER SUPPLY CONTROL APPARATUS AND CONTROL METHOD

CROSS-REFERENCE TO RELATED APPLICATION

This application is based on and claims priority under 35 USC 119 from Japanese Patent Application No. 2021-205997 filed on Dec. 20, 2021.

TECHNICAL FIELD

The present invention relates to a technique for supplying electric power from a plurality of systems.

BACKGROUND ART

The related art discloses a power supply system that supplies electric power from another electric power system to a backup load when an abnormality occurs in some electric power systems among a plurality of electric power systems (for example, see JP-A-2018-182864).

SUMMARY OF INVENTION

However, in the power supply system, an inspection method for inspecting whether backup control performed by a backup load can be executed is not considered. Therefore, after the inspection, a power storage capacity of a power supply that supplies electric power by another electric power system decreases, and a time during which the backup control cannot be executed may become long until the power supply is recharged after the inspection.

The present invention has been made in view of the above circumstance, and an object of the present invention is to provide a power supply control apparatus and a control method capable of quickly executing backup control after inspecting whether the backup control can be executed.

A power supply control apparatus according to an aspect of an embodiment includes a first system, a second system, a plurality of load switches, and a control unit. The first system can supply electric power from a first power supply to a first load. The second system can supply electric power from a second power supply to a load group including a second load and a third load having consumed electric power smaller than that of the second load. The load switches can respectively switch electric power supply to the loads of the load group. In a case where an occurrence of a ground fault in the first system is detected, the control unit controls the load switches so that backup control performed by the second system is executed by the electric power supply from the second power supply. When the control unit inspects whether the backup control can be executed, the control unit connects the load switch corresponding to the third load of the load group, and executes the inspection.

According to an aspect of the embodiment, it is possible to quickly execute backup control after inspecting whether the backup control can be executed.

DETAILED DESCRIPTION OF THE INVENTION

Hereinafter, embodiments of a power supply control apparatus and a control method will be described in detail with reference to the accompanying drawings. The present invention is not limited to the following embodiments. Hereinafter, a power control apparatus mounted on a vehicle that has an automated driving function and supplying electric power to a load will be described as an example, but the power supply control apparatus according to the embodiment may be mounted on a vehicle that does not have the automated driving function.

Further, although a case where the vehicle on which the power supply control apparatus is mounted is an electric vehicle or a hybrid vehicle will be described, the vehicle on which the power supply control apparatus is mounted may be an engine vehicle traveling by an internal combustion engine.

The power supply control apparatus according to the embodiment includes a first power supply that is a main power supply and a second power supply that is an auxiliary power supply. When a power supply failure occurs in the first power supply, the power supply control apparatus may be mounted on any apparatus that backs up the first power supply by the second power supply.

First Embodiment

Figure 1:
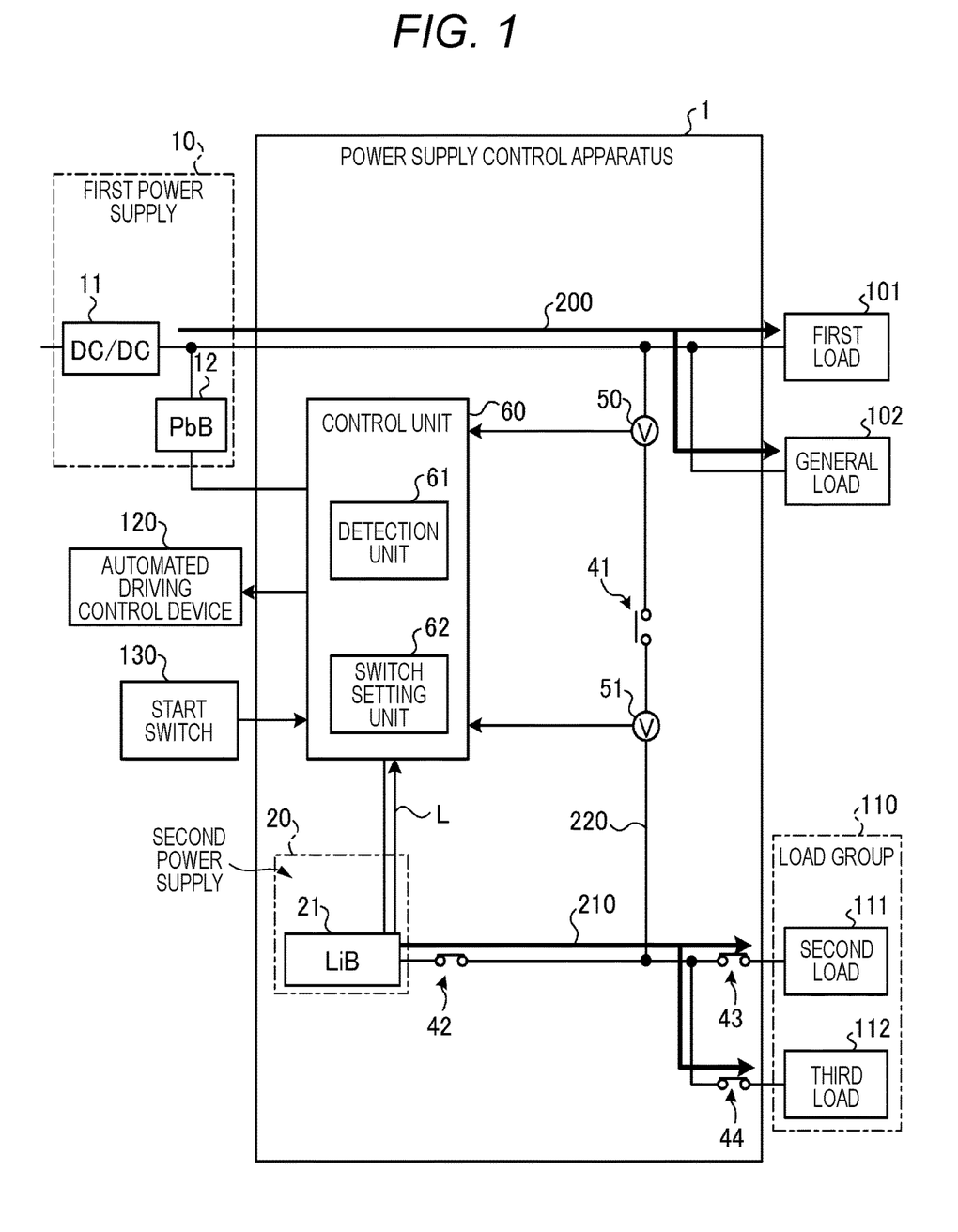
FIG. 1 is an illustrative diagram illustrating a configuration example of a power supply control apparatus according to a first embodiment.

FIG. 1 is an illustrative diagram illustrating a configuration example of a power supply control apparatus 1 according to a first embodiment. As illustrated in FIG. 1, the power supply control apparatus 1 according to the first embodiment is connected to a first power supply 10, a first load 101, a general load 102, a load group 110, an automated driving control device 120, and a start switch 130. The power supply control apparatus 1 includes a first system 200 and a second system 210. The first system 200 can supply electric power from the first power supply 10 to the first load 101 and the general load 102. The second system 210 can supply electric power from a second power supply 20 to be described later to the load group 110.

The first power supply 10 includes a DC/DC converter (hereinafter, referred to as "DC/DC 11") and a lead battery (hereinafter, referred to as a "PbB 12"). A battery of the first power supply 10 may be any secondary battery other than the PbB 12.

The DC/DC 11 is connected to a generator and a high-voltage battery having a voltage higher than that of the PbB 12, steps down the voltages of the generator and the high-voltage battery, and outputs the stepped-down voltages to the first system 200. The generator is, for example, an alternator that converts kinetic energy of a traveling vehicle into electricity to generate electricity. The high-voltage battery is, for example, a battery for driving a vehicle mounted on the electric vehicle or the hybrid vehicle.

When the first power supply 10 is mounted on the engine vehicle, an alternator (generator) is provided instead of the DC/DC 11. The DC/DC 11 charges the PbB 12, supplies electric power to the first load 101 and the general load 102, supplies electric power to the load group 110, and charges the second power supply 20, which will be described later.

The first load 101 includes a load for automated driving. For example, the first load 101 includes a steering motor, an electric brake device, an in-vehicle camera, a radar, and the like that operate during the automated driving.

The general load 102 does not include the load for the automated driving. The general load 102 includes, for example, a display, an air conditioner, an audio, a video, and various kinds of lights.

The load group 110 has the same function as the first load 101. That is, the load group 110 includes the load for the automated driving. The load group 110 includes a second load 111 and a third load 112.

The second load 111 is a device including an actuator that operates during the automated driving among the load for the automated driving. The second load 111 is, for example, a load of a drive system including a steering motor, an electric brake device, and the like. Since relatively large electric power is required to drive the actuator, consumed electric power of the second load 111 is larger than that of a load having no actuator.

The third load 112 is a device not including the actuator that operates during the automated driving among the load for the automated driving. The third load 112 is, for example, a load of a recognition system including an in-vehicle camera, a radar, and the like. The third load 112 may be further divided into a plurality of loads. Since the third load 112 does not include the actuator, consumed electric power of the third load 112 is smaller than that of the second load 111.

The first load 101, the general load 102, and the load group 110 are operated by the electric power supplied from the power supply control apparatus 1.

The automated driving control device 120 is a device that controls the automated driving of the vehicle by operating at least one of the first load 101 and the load group 110. The automated driving control device 120 can execute fail-safe control (hereinafter, referred to as "backup control") of automated driving control by operating any one of the first load 101 and the load group 110. When a ground fault occurs in the first system 200 or a second system 210, the automated driving control device 120 controls the system in which no ground fault occurs to execute the backup control. The backup control is control of causing the vehicle to perform limp-home traveling to a safe place by the automated driving. The backup control is executed when a power supply failure, in addition to the ground fault, occurs in which electric power cannot be supplied from the first system 200 or the second system 210. Hereinafter, an example in which a ground fault has occurred will be described, but a process described below can be appropriately applied to a case in which a power supply failure has occurred.

The start switch 130 is a switch for switching a power supply system between an on state and an off state. The start switch 130 may be an ignition switch or an accessory (ACC) switch.

The power supply control apparatus 1 includes the second power supply 20, an inter-system switch 41, a battery switch 42, a plurality of load switches 43, 44, a first voltage sensor 50, a second voltage sensor 51, and a control unit 60.

The second power supply 20 is a backup power supply for a case where the electric power cannot be supplied by the first power supply 10. The second power supply 20 includes a lithium ion battery (hereinafter, referred to as a "LiB 21"). A battery of the second power supply 20 may be any secondary battery other than the LiB 21. The second power supply 20 is provided with a measurement device. The measurement device acquires voltage information of the LiB 21. That is, a voltage of the LiB 21 is measured by the measurement device.

The inter-system switch 41 is provided on an inter-system line 220 that connects the first system 200 and the second system 210. The inter-system switch 41 is a switch that can connect or disconnect the first system 200 and the second system 210. When the inter-system switch 41 is turned on, both ends of the inter-system switch 41 are electrically connected. When the inter-system switch 41 is turned off, the both ends of the inter-system switch 41 are electrically disconnected. The same applies to the other switches.

The battery switch 42 is a switch that can connect or disconnect the LiB 21 and the second system 210.

The plurality of load switches 43, 44 are switches capable of respectively switching electric power supply to the second load 111 and the third load 112 of the load group 110. The plurality of load switches 43, 44 include the first switch 43 and the second switch 44.

The first switch 43 is provided in the second system 210. The first switch 43 is provided corresponding to the second load 111. The first switch 43 is a switch that switches whether to supply electric power to the second load 111. The first switch 43 connects or disconnects the second load 111 and the second system 210.

The second switch 44 is provided in the second system 210. The second switch 44 is provided corresponding to the third load 112. The second switch 44 is a switch that switches whether to supply electric power to the third load 112. The second switch 44 connects or disconnects the third load 112 and the second system 210.

The first voltage sensor 50 is provided in the first system 200, detects a voltage of the first system 200, and outputs a detection result to the control unit 60. The second voltage sensor 51 is provided in the second system 210, detects a voltage of the second system 210, and outputs a detection result to the control unit 60.

The control unit 60 includes a microcomputer having a central processing unit (CPU), a read only memory (ROM), a random access memory (RAM), and the like, and various circuits. The control unit 60 may be configured with hardware such as an application specific integrated circuit (ASIC) or a field programmable gate array (FPGA).

The control unit 60 includes a detection unit 61 that functions by the CPU executing a program stored in the ROM using the RAM as a work area, and a switch setting unit 62, and controls operations of the power supply control apparatus 1. The control unit 60 is supplied with electric power from the first power supply 10 and the second power supply 20 to operate. That is, the control unit 60 can operate by being supplied with electric power from the first power supply 10 or the second power supply 20. Functions of the detection unit 61 and the switch setting unit 62 may be divided into a plurality of functions.

When an occurrence of a ground fault in the first system 200 is detected, the control unit 60 controls the first switch 43 and the second switch 44 so that the backup control performed by the second system 210 is executed by the electric power supply from the second power supply 20. When the control unit 60 inspects whether the backup control can be executed, the control unit 60 turns on the second switch 44 corresponding to the third load 112 having small consumed electric power of the load group 110, and executes the inspection.

The detection unit 61 detects a ground fault of the first system 200 or the second system 210 based on the detection results received from the first voltage sensor 50 and the second voltage sensor 51.

The detection unit 61 determines whether the voltage detected by the first voltage sensor 50 is within a normal range in a normal state in which the inter-system switch 41 is turned on. The normal range is a range indicated by the voltage detected by the first voltage sensor 50 when no ground fault occurs in the first system 200. For example, the normal range is a range in which the voltage detected by the first voltage sensor 50 is equal to or higher than a voltage threshold set in advance.

When the voltage detected by the first voltage sensor 50 is not within the normal range in the normal state, for example, when the voltage is smaller than the voltage threshold, the detection unit 61 detects that a ground fault occurs in the first system 200.

When the voltage detected by the first voltage sensor 50 is within the normal range in the normal state, the detection unit 61 detects that no ground fault occurs in the first system 200.

In the normal state, the detection unit 61 can detect an occurrence of a ground fault in the second system 210 based on the voltage detected by the second voltage sensor 51.

When the ground fault of the first system 200 or the second system 210 is detected, the detection unit 61 notifies the automated driving control device 120 of the fact. When the ground fault of the first system 200 or the second system 210 is detected, the detection unit 61 may notify the automated driving control device 120 of a fact that the automated driving is impossible. When the ground fault of the first system 200 or the second system 210 is not detected, the detection unit 61 may notify the automated driving control device 120 of a fact that the automated driving is possible.

The detection unit 61 acquires the voltage information of the LiB 21 from the measurement device of the second power supply 20 via a line L, and detects the voltage of the LiB 21. The detection unit 61 detects a state of charge (SOC) of the second power supply 20 based on the voltage of the LiB 21. The detection unit 61 may acquire current information and temperature information in addition to the voltage information, and may detect the state of charge of the second power supply 20 using the current information or the like.

When the start switch 130 is turned on, the detection unit 61 inspects in the background whether the backup control performed by the second power supply 20 can be executed. The detection unit 61 may perform the inspection when the start switch 130 is turned off.

The detection unit 61 performs the inspection in a state where the second switch 44 corresponding to the third load 112 of the load group 110 is connected.

In the inspection, electric power is supplied from the second power supply 20 to the third load 112 for a predetermined time in a state where the inter-system switch 41 and the first switch 43 are turned off and the battery switch 42 and the second switch 44 are turned on.

The predetermined time is a time set in advance, and is a time during which a startup process is performed after the start switch 130 is turned on. The predetermined time is several seconds such as 2 seconds and 3 seconds.

The detection unit 61 determines whether the predetermined time has elapsed after the start switch 130 is turned on. The detection unit 61 executes the inspection based on a voltage of the LiB 21 after the predetermined time has elapsed. The voltage of the LiB 21 after the predetermined time has elapsed is a voltage of the LiB 21 immediately after the predetermined time has elapsed.

The detection unit 61 determines whether the voltage of the LiB 21 after the predetermined time has elapsed is equal to or higher than a predetermined voltage. When the voltage of the LiB 21 after the predetermined time has elapsed is equal to or higher than the predetermined voltage, the detection unit 61 determines that the backup control performed by the second power supply 20 can be executed. When the voltage of the LiB 21 after the predetermined time has elapsed is less than the predetermined voltage, the detection unit 61 determines that the backup control performed by the second power supply 20 cannot be executed.

The predetermined voltage is a voltage set in advance. The predetermined voltage is set to a lower limit voltage after the backup control performed by the second power supply 20 is executed during a limp-home traveling time. The limp-home traveling time is a time set in advance, and is a time required for the vehicle to perform the limp-home traveling to a safe place by the backup control performed by the second power supply 20. The limp-home traveling time is set based on experimental results, calculations, simulation results, and the like.

The lower limit voltage is a voltage of the LiB 21 after the backup control is performed by the second power supply 20 for the limp-home traveling time and the vehicle performs the limp-home traveling to a safe place. That is, it means that when the voltage of the LiB 21 is equal to or higher than the lower limit voltage after the limp-home traveling time from a start of the backup control performed by the second power supply 20, the vehicle can perform the limp-home traveling to a safe place.

Therefore, it is possible to determine an execution possibility of the backup control performed by the second power supply 20 by comparing a voltage change of the LiB 21 that becomes the lower limit voltage after the limp-home traveling time (hereinafter, referred to as "lower limit voltage change of the LiB 21") with a voltage change in a case electric power is supplied from the second power supply 20 to the load group 110.

Specifically, when the voltage of the LiB 21 at a certain time in the case where electric power is supplied from the second power supply 20 to the load group 110 is equal to or higher than a voltage at a certain time in a lower limit voltage change of the LiB 21, the backup control can be executed by the second power supply 20. On the other hand, when the voltage of the LiB 21 at a certain time in the case where electric power is supplied from the second power supply 20 to the load group 110 is less than the voltage at a certain time in the lower limit voltage change of the LiB 21, the backup control cannot be executed by the second power supply 20.

Figure 2:
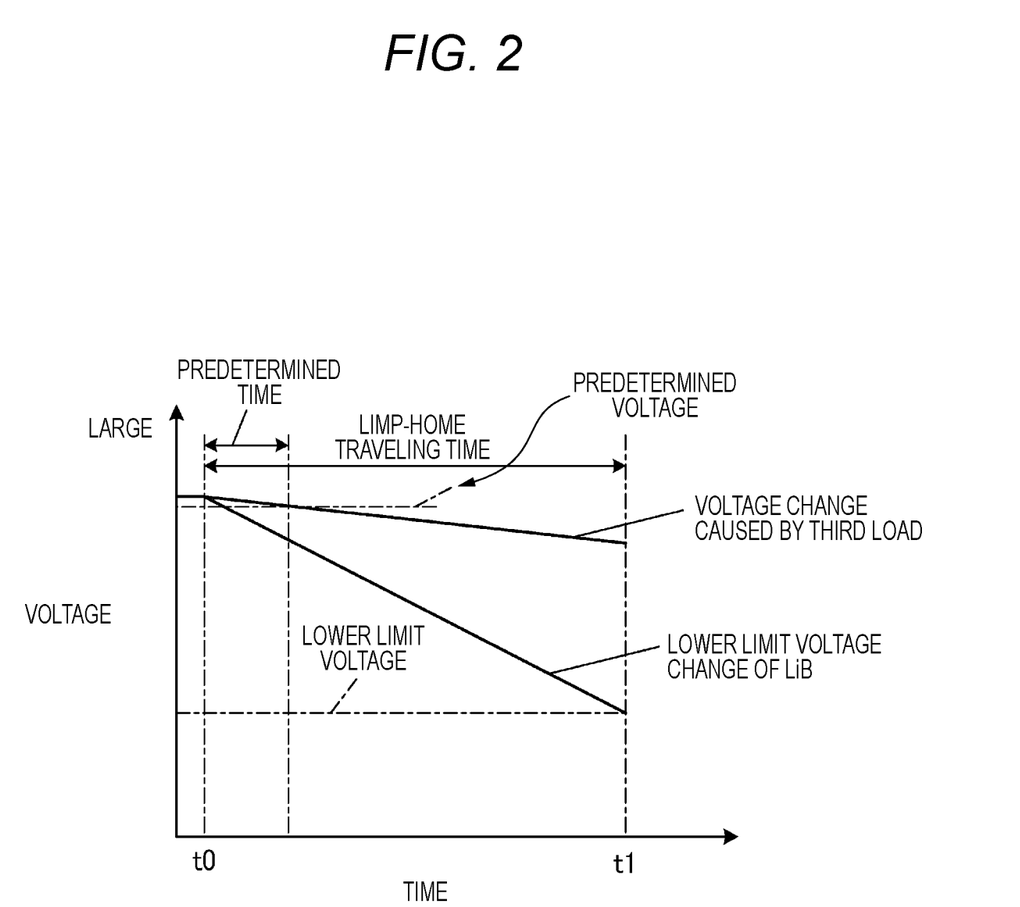
FIG. 2 is a diagram illustrating a voltage change in a case where backup control is performed by a second power supply.

Regarding the lower limit voltage change of the LiB 21, the voltage change of the LiB 21 caused by electric power consumption in the third load 112 (hereinafter, referred to as "voltage change caused by the third load 112") is illustrated in FIG. 2, for example. The lower limit voltage change of the LiB 21 and the voltage change caused by the third load 112 are obtained by experiments or the like. FIG. 2 is a diagram illustrating a voltage change in the case where the backup control is performed by the second power supply 20. In FIG. 2, at a time t0, the backup control performed by the second power supply 20 is started. At a time t1, the vehicle performs the limp-home traveling to a safe place.

By comparing the voltage change caused by the third load 112 with an inspection voltage change when the start switch 130 is turned off (hereinafter, referred to as "inspection voltage change"), it is possible to determine the execution possibility of the backup control performed by the second power supply 20 in the same manner.

Specifically, when a voltage in the inspection voltage change is equal to or higher than a voltage in the voltage change caused by the third load 112, the backup control performed by the second power supply 20 can be executed. On the other hand, when the voltage in the inspection voltage change is less than the voltage in the voltage change caused by the third load 112, the backup control cannot be executed.

As described above, the execution possibility of the backup control performed by the second power supply 20 can be determined based on the electric power consumption in the third load 112.

As illustrated in FIG. 2, the predetermined voltage is a voltage of the LiB 21 for the predetermined time in the voltage change caused by the third load 112. The predetermined voltage is set based on experimental results, calculations, simulation results, and the like.

The detection unit 61 may determine whether the backup control performed by the second power supply 20 can be executed based on a voltage difference of the LiB 21 after the predetermined time has elapsed. The voltage difference is a difference between the voltage of the Lib 21 in the inspection voltage change and the voltage of the LiB 21 in the voltage change caused by the third load 112.

When the backup control performed by the second power supply 20 can be executed, the voltage of the Lib 21 in the inspection voltage change is equal to or higher than the voltage of the LiB 21 in the voltage change caused by the third load 112. Therefore, when the backup control performed by the second power supply 20 can be executed, the voltage difference of the LiB 21 is equal to or larger than a predetermined amount. The predetermined amount is a value set in advance, and is, for example, "0". When the backup control performed by the second power supply 20 cannot be executed, the voltage of the Lib 21 in the inspection voltage change is less than the voltage of the LiB 21 in the voltage change caused by the third load 112. Therefore, the voltage difference of the LiB 21 is less than the predetermined amount (that is, negative).

When the voltage difference of the LiB 21 after the predetermined time has elapsed is equal to or higher than the predetermined amount, the detection unit 61 determines that the backup control performed by the second power supply 20 can be executed. When the voltage difference of the LiB 21 after the predetermined time has elapsed is less than the predetermined amount, the detection unit 61 determines that the backup control performed by the second power supply 20 cannot be executed.

In addition, the detection unit 61 may determine whether the backup control performed by the second power supply 20 can be executed based on a voltage decrease amount which is a difference between a voltage of the LiB 21 at the start of the inspection and the voltage of the LiB 21 after the predetermined time has elapsed, that is, a voltage amount of the LiB 21 decreased during the predetermined time at the time of the inspection. In this case, when the voltage decrease amount is less than a predetermined amount, the detection unit 61 determines that the backup control performed by the second power supply 20 can be executed. Further, when the voltage decrease amount is equal to or higher than the predetermined amount, the detection unit 61 determines that the backup control performed by the second power supply 20 cannot be executed.

Figure 3:
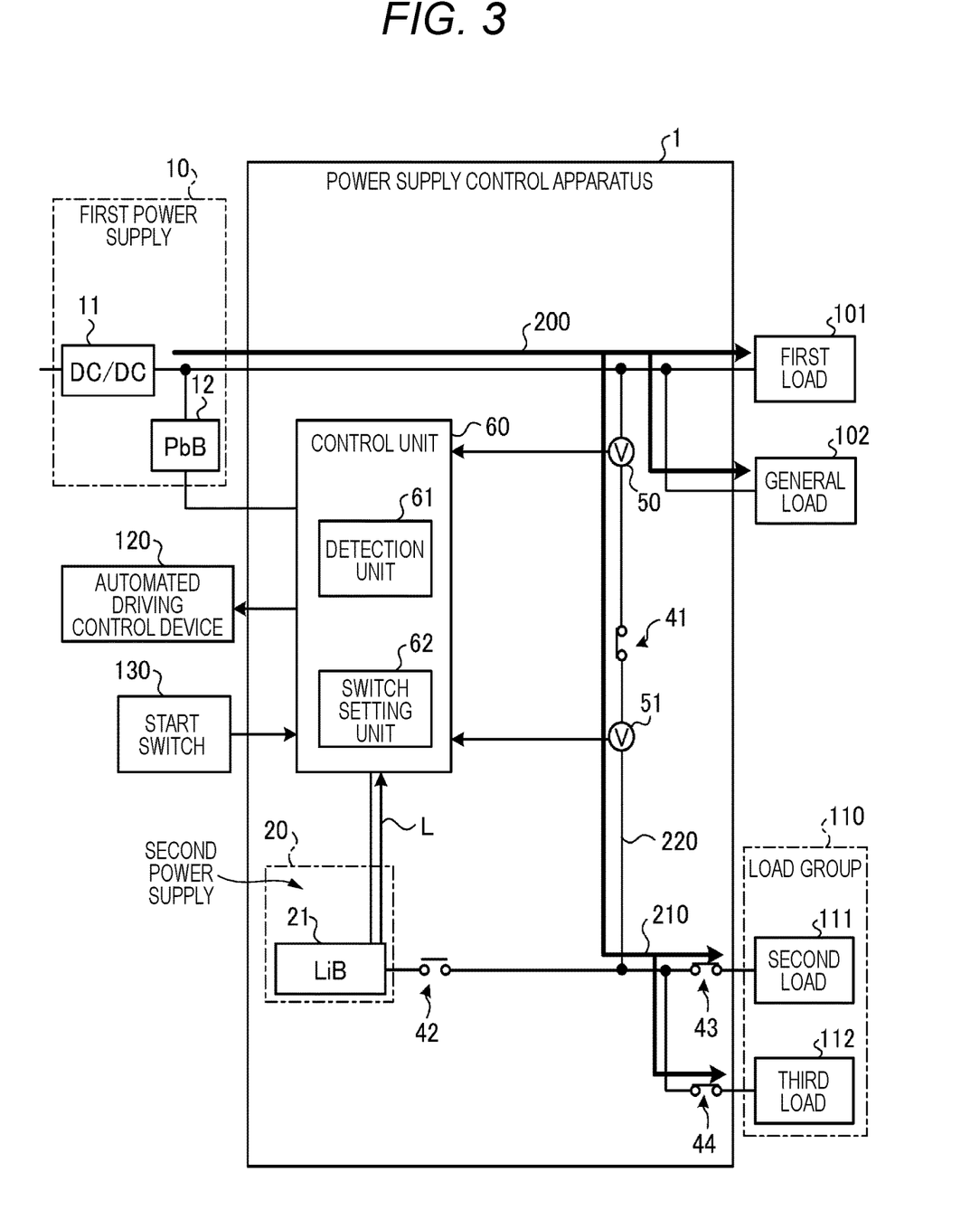
FIG. 3 is a diagram illustrating electric power supply performed by a first power supply.

The switch setting unit 62 sets each of the switches 41 to 44 to ON or OFF and switches ON and OFF of each of the switches 41 to 44. When a ground fault does not occur in the first system 200 and the second system 210, the switch setting unit 62 turns on the inter-system switch 41, the first switch 43, and the second switch 44. As a result, as illustrated in FIG. 3, electric power is supplied from the first power supply 10 to the first load 101 and the general load 102 by the first system 200. FIG. 3 is a diagram illustrating electric power supply performed by the first power supply 10. Electric power is supplied from the first power supply 10 to the second load 111 and the third load 112 of the load group 110 by the first system 200, the inter-system line 220, and the second system 210.

When the second power supply 20 is charged, the switch setting unit 62 further turns on the battery switch 42. As a result, electric power is supplied from the first power supply 10 to the LiB 21 of the second power supply 20, and the LiB 21 is charged. When the LiB 21 of the second power supply 20 is not charged, the switch setting unit 62 turns off the battery switch 42.

Figure 4:
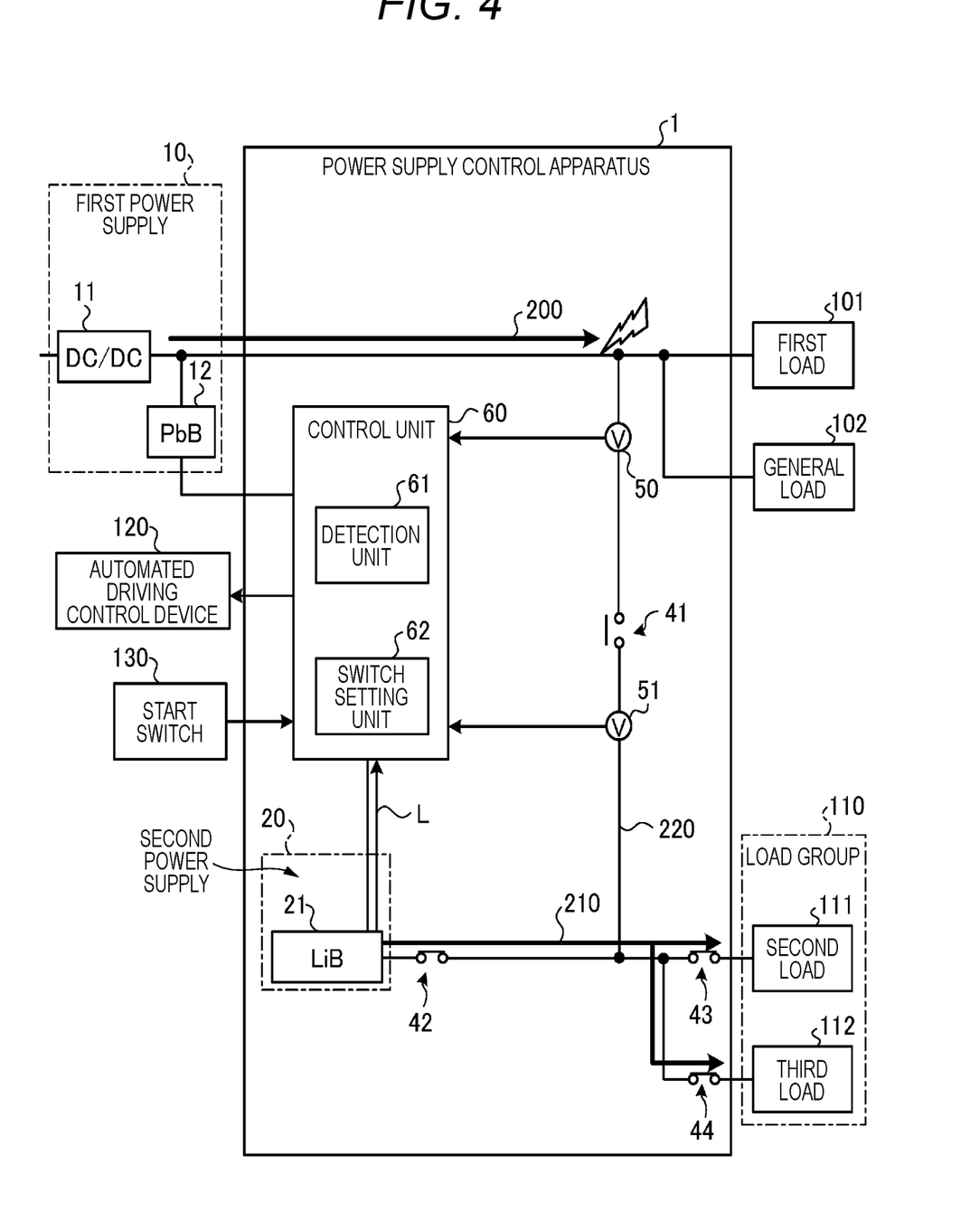
FIG. 4 is a diagram illustrating electric power supply in a case where a ground fault has occurred in a first system.

When a ground fault occurs in the first system 200, the switch setting unit 62 turns off the inter-system switch 41. Further, the switch setting unit 62 turns on the battery switch 42, the first switch 43, and the second switch 44. As a result, as illustrated in FIG. 4, electric power is supplied from the second power supply 20 to the load group 110 by the second system 210. FIG. 4 is a diagram illustrating electric power supply in a case where a ground fault has occurred in the first system 200.

Figure 5:
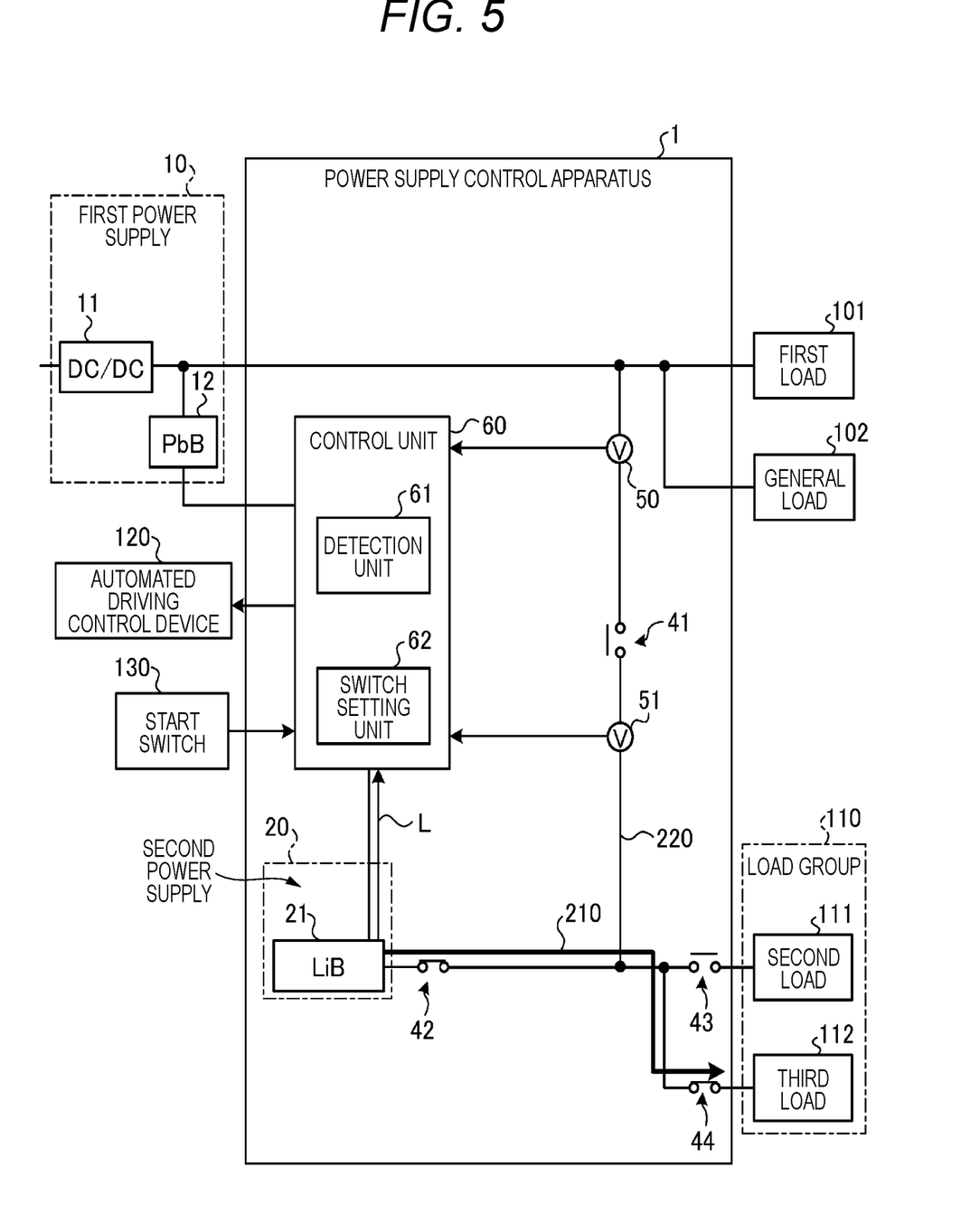
FIG. 5 is a diagram illustrating electric power supply in a case where inspection of whether the backup control can be executed by the second power supply is performed.

When the inspection of whether the backup control performed by the second power supply 20 can be executed is performed, the switch setting unit 62 turns off the inter-system switch 41 and the first switch 43. Further, the switch setting unit 62 turns on the battery switch 42 and the second switch 44. As a result, as illustrated in FIG. 5, electric power is supplied from the second power supply 20 to the third load 112 by the second system 210. Since the first switch 43 is OFF, electric power is not supplied to the second load 111. FIG. 5 is a diagram illustrating electric power supply in a case where the inspection of whether the backup control can be executed by the second power supply 20 is performed.

Figure 6:
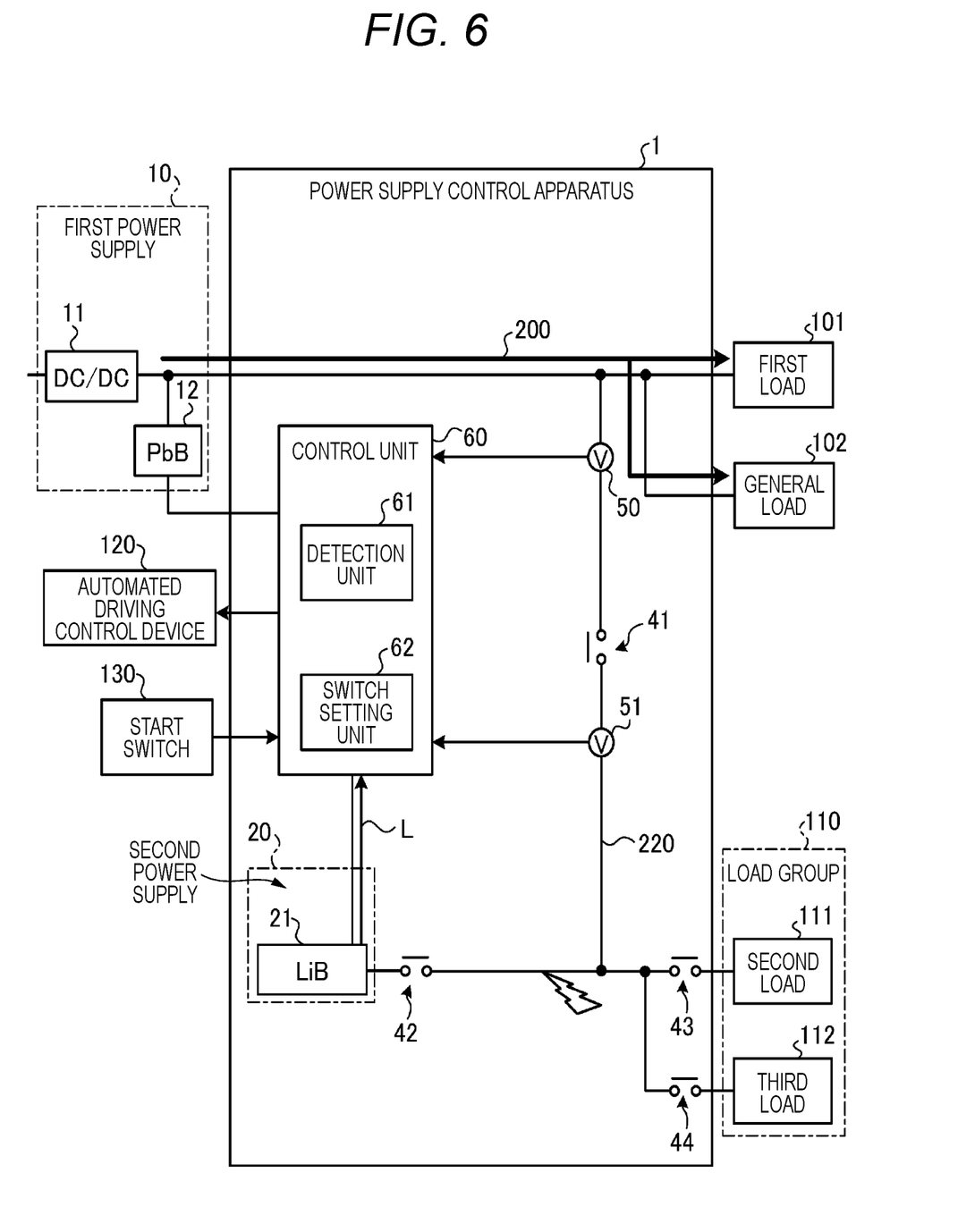
FIG. 6 is a diagram illustrating electric power supply in a case where a ground fault has occurred in a second system.

When a ground fault occurs in the second system 210, the switch setting unit 62 turns off the inter-system switch 41, the battery switch 42, the first switch 43, and the second switch 44. As a result, as illustrated in FIG. 6, electric power is supplied from the first power supply 10 to the first load 101 and the general load 102 by the first system 200. FIG. 6 is a diagram illustrating electric power supply in a case where a ground fault has occurred in the second system 210.

Figure 7:
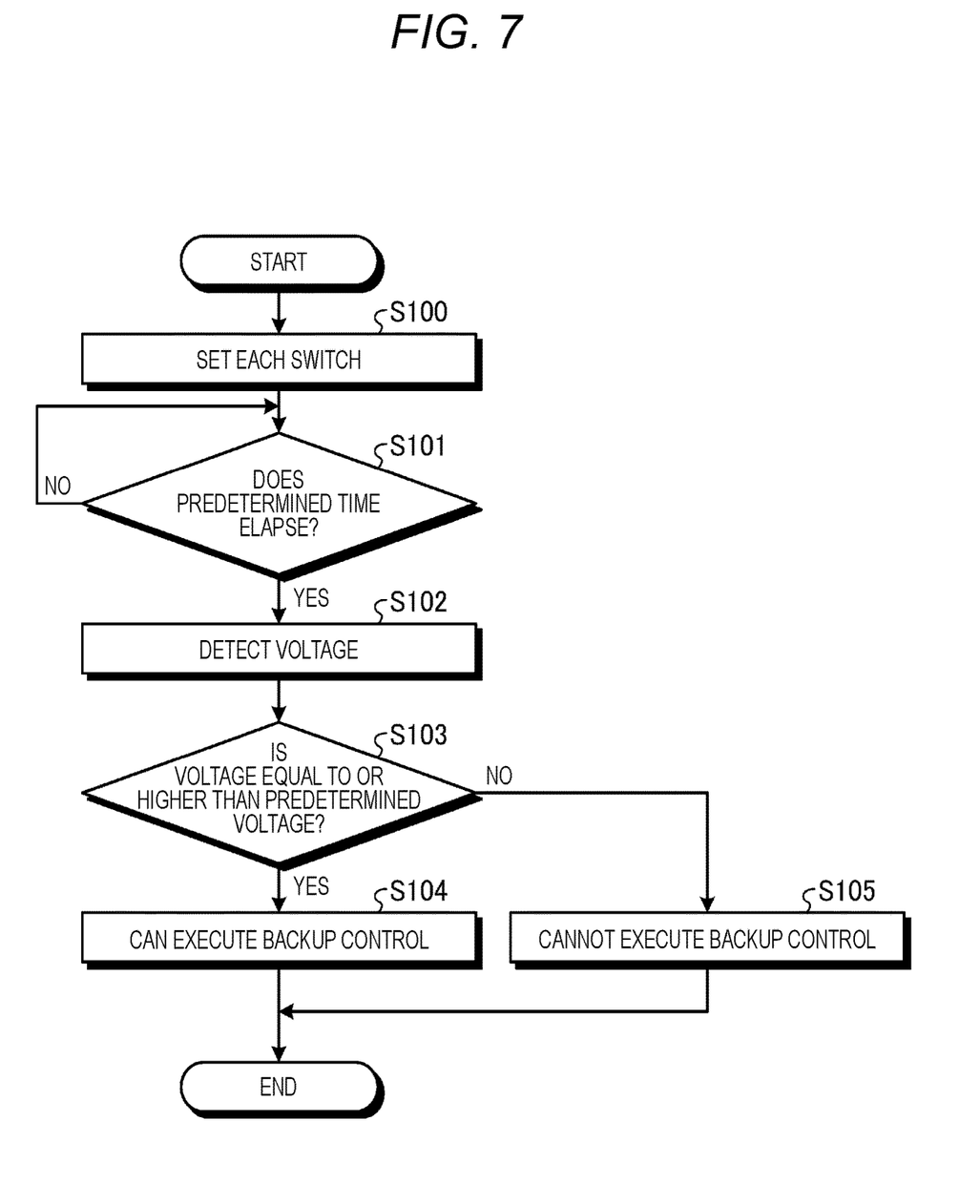
FIG. 7 is a flowchart illustrating an inspection process according to the first embodiment.

Next, an inspection process according to the embodiment will be described with reference to FIG. 7. FIG. 7 is a flowchart illustrating an inspection process according to the first embodiment. The inspection process is executed when the start switch 130 is turned on.

The power supply control apparatus 1 sets each of the switches 41 to 44 (S100). Specifically, the power supply control apparatus 1 turns off the inter-system switch 41 and the first switch 43, and turns on the battery switch 42 and the second switch 44.

The power supply control apparatus 1 determines whether the predetermined time has elapsed after the start switch 130 is turned on (S101). That is, the power supply control apparatus 1 determines whether the start switch 130 is turned on and the startup process is performed. When the predetermined time has not elapsed yet (S101: No), the power supply control apparatus 1 repeats the determination until the predetermined time has elapsed (S101).

When the predetermined time has elapsed after the start switch 130 is turned on (S101: Yes), the power supply control apparatus 1 detects the voltage of the LiB 21 (S102). That is, the power supply control apparatus 1 detects a voltage of the LiB 21 decreased due to the electric power supply from the second power supply 20 to the third load 112.

The power supply control apparatus 1 determines whether the detected voltage of the LiB 21 is equal to or higher than the predetermined voltage (S103). When the voltage of the LiB 21 is equal to or higher than the predetermined voltage (S103: Yes), the power supply control apparatus 1 determines that the backup control performed by the second power supply 20 can be executed (S104).

When the voltage of the LiB 21 is less than the predetermined voltage (S103: No), the power supply control apparatus 1 determines that the backup control performed by the second power supply 20 cannot be executed (S105).

When the inspection of whether the backup control can be executed is performed, a method of supplying electric power from the second power supply 20 to the second load 111 and the third load 112 of the load group 110 may be considered as in the actual backup control.

However, when electric power is supplied from the second power supply 20 to the second load 111 and the third load 112, the state of charge of the second power supply 20 after the inspection significantly decreases. Therefore, the backup control performed by the second power supply 20 cannot be executed until the second power supply 20 is recharged.

Accordingly, the power supply control apparatus 1 according to the embodiment includes the first system 200, the second system 210, the first switch 43, the second switch 44 (the plurality of load switches), and the control unit 60. The first system 200 can supply electric power from the first power supply 10 to the first load 101. The second system 210 can supply electric power from the second power supply 20 to the load group 110 including the second load 111 and the third load 112 having consumed electric power smaller than that of the second load 111. The first switch 43 and the second switch 44 can respectively switch the electric power supply to the second load 111 and the third load 112 of the load group 110. When an occurrence of a ground fault in the first system 200 is detected, the control unit 60 controls the first switch 43 and the second switch 44 so that the backup control performed by the second system 210 is executed by the electric power supply from the second power supply 20. When the control unit 60 inspects whether the backup control can be executed, the control unit 60 connects the second switch 44 corresponding to the third load 112 of the load group 110, and executes the inspection.

As a result, the power supply control apparatus 1 can inspect whether the backup control performed by the second system 210 can be executed, and can prevent the decrease in the state of charge of the second power supply 20 after the inspection. Therefore, the power supply control apparatus 1 can promptly complete charging of the second power supply 20 after the inspection, and can quickly execute the backup control after the inspection.

The power supply control apparatus 1 includes the inter-system switch 41 and the battery switch 42. The inter-system switch 41 connects or disconnects the first system 200 and the second system 210. The battery switch 42 connects or disconnects the second power supply 20 and the second system 210. In a state where the inter-system switch 41 is disconnected and the battery switch 42 is connected, the control unit 60 supplies electric power from the second power supply 20 to the third load 112 for the predetermined time, and executes the inspection based on the voltage of the LiB 21 after the predetermined time has elapsed.

As a result, the power supply control apparatus 1 can disconnect the first system 200 and the second system 210 from each other, supply electric power from the second power supply 20 to the third load 112 in the same state as the state in which a ground fault occurs in the first system 200, and execute the inspection. Therefore, the power supply control apparatus 1 can accurately determine whether the backup control performed by the second power supply 20 can be executed.

When performing the inspection, the control unit 60 disconnects the first switch 43 corresponding to the second load 111.

As a result, the power supply control apparatus 1 can prevent the decrease in the state of charge of the second power supply 20 after the inspection. Therefore, the power supply control apparatus 1 can promptly complete charging of the second power supply 20 after the inspection, and can quickly execute the backup control after the inspection.

Second Embodiment

Figure 8:
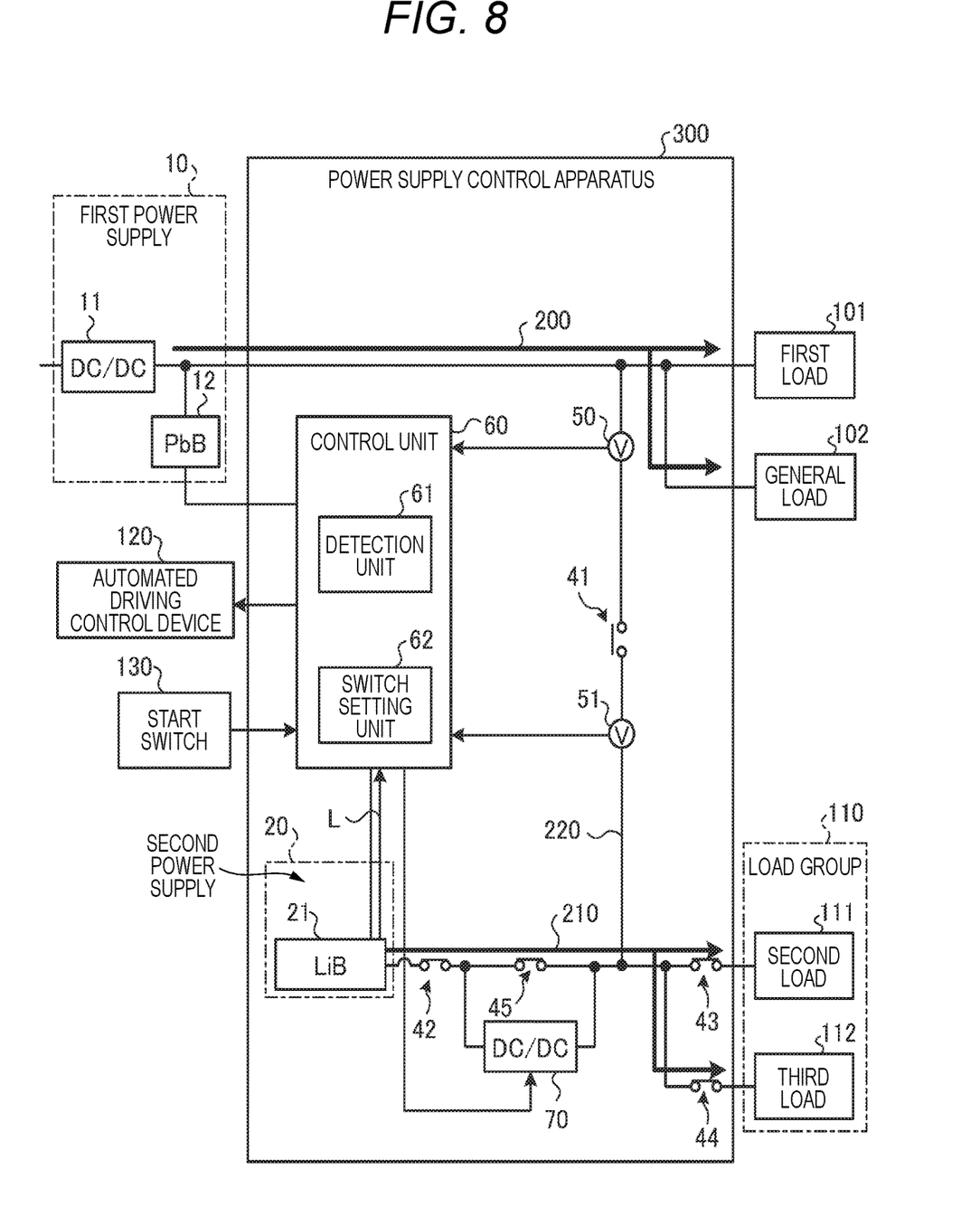
FIG. 8 is a diagram illustrating a configuration example of a power supply control apparatus according to a second embodiment.

Next, a power supply control apparatus 300 according to a second embodiment will be described with reference to FIG. 8. FIG. 8 is a diagram illustrating a configuration example of the power supply control apparatus 300 according to the second embodiment. Here, differences from the first embodiment will be mainly described. The same components as those of the first embodiment are denoted by the same reference numerals as those of the first embodiment, and a detailed description thereof will be omitted.

The power supply control apparatus 300 further includes a bypass switch 45 and a DC/DC converter (hereinafter referred to as "DC/DC 70").

The bypass switch 45 is provided in the second system 210. The bypass switch 45 is provided between a connection portion between the inter-system line 220 and the second system 210 and the battery switch 42. A DC/DC 70 is connected in parallel with the bypass switch 45. The DC/DC 70 is controlled by the detection unit 61 and adjusts a voltage input to the LiB 21.

When the second power supply 20 is charged, the switch setting unit 62 turns off the bypass switch 45, and the detection unit 61 drives the DC/DC 70. Thus, when the second power supply 20 is charged, a current flows through the DC/DC 70. When the second power supply 20 is not charged, the detection unit 61 stops the DC/DC 70.

When a ground fault occurs in the first system 200, the switch setting unit 62 turns on the bypass switch 45. Further, when the inspection of whether the backup control performed by the second power supply 20 can be executed is performed, the switch setting unit 62 turns on the bypass switch 45. Thus, when electric power is supplied from the second power supply 20, no current flows through the DC/DC 70, and a current flows through the bypass switch 45.

The detection unit 61 checks an operation of the bypass switch 45 when inspecting whether the backup control performed by the second power supply 20 can be executed.

When inspecting whether the backup control performed by the second power supply 20 can be executed, the detection unit 61 controls the DC/DC 70 so that a current smaller than a current flowing through the third load 112 flows in a state where the bypass switch 45 is turned on. Even when the DC/DC 70 is controlled so that the current smaller than the current flowing through the third load 112 flows, the current flows through the bypass switch 45 as long as the bypass switch 45 is turned on. Therefore, when the bypass switch 45 is turned on, an influence due to the control of the DC/DC 70 is small. Therefore, the voltage of the LiB 21 decreases due to the electric power supply to the third load 112 via the bypass switch 45.

In contrast, when the bypass switch 45 is fixed to OFF, the influence due to the control of the DC/DC 70 is large, and the voltage of the LiB 21 is larger than that when the bypass switch 45 is turned on.

When inspecting whether the backup control performed by the second power supply 20 can be executed, the detection unit 61 can determine whether the bypass switch 45 is fixed to OFF by detecting the voltage of the LiB 21 in the state where the bypass switch 45 is turned on.

A modification of the method of determining whether the bypass switch 45 is fixed to OFF may be as follows. That is, when the inspection of whether the backup control performed by the second power supply 20 can be executed is performed, the detection unit 61 stops the DC/DC 70 and turns on the bypass switch 45. When the bypass switch 45 is in a normal state in which being fixed to OFF does not occur, the voltage of the LiB 21 decreases due to the electric power supply to the third load 112 via the bypass switch 45. However, if the bypass switch 45 is fixed to OFF, no current flows through the third load 112, and thus the voltage decrease amount of the LiB 21 becomes zero. When inspecting whether the backup control performed by the second power supply 20 can be executed, the detection unit 61 can determine that the bypass switch 45 is fixed to OFF if the voltage decrease amount of the LiB 21 in the state where the bypass switch 45 is turned on is zero.

The power supply control apparatus 1 includes the inter-system switch 41, the DC/DC 70, and the bypass switch 45. The inter-system switch 41 connects or disconnects the first system 200 and the second system 210. The DC/DC 70 is provided in the second system 210. The bypass switch 45 is connected in parallel to the DC/DC 70. In a state where the inter-system switch 41 is disconnected and the bypass switch 45 is connected, the control unit 60 supplies electric power from the second power supply 20 to the third load 112 for the predetermined time, and executes the inspection based on the voltage of the LiB 21 after the predetermined time has elapsed.

Accordingly, the power supply control apparatus 1 can check the operation of the bypass switch 45 while determining whether the backup control performed by the second power supply 20 can be executed.

Additional effects and modifications can be easily derived by those skilled in the art. Therefore, broader aspects of the present invention are not limited to the specific details and the representative embodiments shown and described above. Therefore, various modifications can be made without departing from the spirit or scope of the general inventive concept as defined by the appended claims and equivalents of the claims.

REFERENCE SIGNS LIST 1, 300 power supply control apparatus
10 first power supply
20 second power supply
41 inter-system switch
42 battery switch
43 load switch, first switch
44 load switch, second switch
45 bypass switch
60 control unit
61 detection unit
62 switch setting unit
70 DC/DC converter
101 first load
110 load group
111 second load
112 third load
120 automated driving control device

What is claimed is:

1. A power supply control apparatus comprising:
a first system capable of supplying electric power from a first power supply to a first load;
a second system capable of supplying electric power from a second power supply to a load group including a second load and a third load having consumed electric power smaller than that of the second load;
an inter-system switch configured to connect or disconnect the first system and the second system;
a battery switch configured to connect or disconnect the second power supply and the second system;
a plurality of load switches capable of respectively switching electric power supply to each of the loads of the load group; and
at least one processor configured to control the load switches so that backup control performed by the second system is executed by the electric power supply from the second power supply, in a case where an occurrence of a ground fault in the first system is detected,
wherein when the at least one processor inspects as to whether the backup control can be executed, the at least one processor connects the load switch corresponding to the third load of the load group, and in a state in which the inter-system switch is disconnected and the battery switch is connected, supplies electric power from the second power supply to the third load for a predetermined time and executes the inspection based on a voltage of the second power supply after the predetermined time elapses.

2. The power supply control apparatus according to claim 1,
wherein the at least one processor disconnects the load switch corresponding to the second load when the at least one processor executes the inspection.

3. The power supply control apparatus according to claim 1,
wherein the at least one processor determines that the backup control can be executed in a case where the voltage of the second power supply after the predetermined time elapses is equal to or higher than a threshold voltage.

4. The power supply control apparatus according to claim 1,
wherein the at least one processor determines that the backup control can be executed in a case where a voltage amount of the second power supply decreased during the predetermined time by an amount that is less than a threshold amount.

5. A power supply control apparatus comprising:
a first system capable of supplying electric power from a first power supply to a first load;
a second system capable of supplying electric power from a second power supply to a load group including a second load and a third load having consumed electric power smaller than that of the second load;
an inter-system switch configured to connect or disconnect the first system and the second system;
a DC/DC converter provided in the second system;
a bypass switch connected in parallel to the DC/DC converter;
a plurality of load switches capable of respectively switching electric power supply to each of the loads of the load group; and
at least one processor configured to control the load switches so that backup control performed by the second system is executed by the electric power supply from the second power supply, in a case where an occurrence of a ground fault in the first system is detected,
wherein when the at least one processor inspects as to whether the backup control can be executed, the at least one processor connects the load switch corresponding to the third load of the load group, and in a state in which the inter-system switch is disconnected and the bypass switch is connected, supplies electric power from the second power supply to the third load for a predetermined time and executes the inspection based on a voltage of the second power supply after the predetermined time elapses.

6. The power supply control apparatus according to claim 5,
wherein the at least one processor disconnects the load switch corresponding to the second load when the at least one processor executes the inspection.

7. The power supply control apparatus according to claim 5,
wherein the at least one processor determines that the backup control can be executed in a case where the voltage of the second power supply after the predetermined time elapses is equal to or higher than a threshold voltage.

8. The power supply control apparatus according to claim 5,
wherein the at least one processor determines that the backup control can be executed in a case where a voltage amount of the second power supply decreased during the predetermined time by an amount that is less than a threshold amount.

9. The power supply control apparatus according to claim 5,
wherein the at least one processor is configured to charge the second power supply by driving the DC/DC converter in a state in which the bypass switch is disconnected.

10. The power supply control apparatus according to claim 5,
wherein the at least one processor determines whether the bypass switch is fixed to OFF based on a voltage decrease amount of the second power supply in a state in which the bypass switch is connected, to execute the inspection.

11. A control method of a power supply control apparatus, the power supply control apparatus including a first system capable of supplying electric power from a first power supply to a first load, a second system capable of supplying electric power from a second power supply to a load group including a second load and a third load having consumed electric power smaller than that of the second load, an inter-system switch configured to connect or disconnect the first system and the second system, a battery switch configured to connect or disconnect the second power supply and the second system, and a plurality of load switches capable of respectively switching electric power supply to each of the loads, and the control method comprising:
controlling the load switches so that backup control performed by the second system is executed by the electric power supply from the second power supply, in a case where an occurrence of a ground fault in the first system is detected; and
when inspecting whether the backup control can be executed, connecting the load switch corresponding to the third load of the load group, and in a state in which the inter-system switch is disconnected and the battery switch is connected, supplying electric power from the second power supply to the third load for a predetermined time and executing the inspection based on a voltage of the second power supply after the predetermined time elapses.

12. The control method according to claim 11, further comprising:
disconnecting the load switch corresponding to the second load to execute the inspection.

13. The control method according to claim 11, wherein
it is determined that the backup control can be executed in a case where the voltage of the second power supply after the predetermined time elapses is equal to or higher than a threshold voltage.

14. The control method according to claim 11, wherein
it is determined that the backup control can be executed in a case where a voltage amount of the second power supply decreased during the predetermined time by an amount that is less than a threshold amount.

* * * * *